Dec. 7, 1926.
A. BLACKMAN
1,609,856
FILTER FOR PETROL AND OTHER LIQUIDS
Filed July 14, 1925
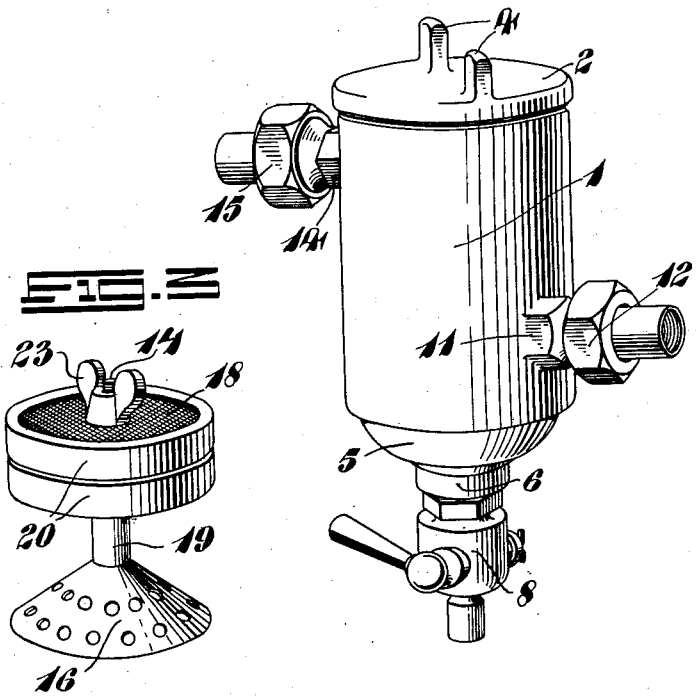
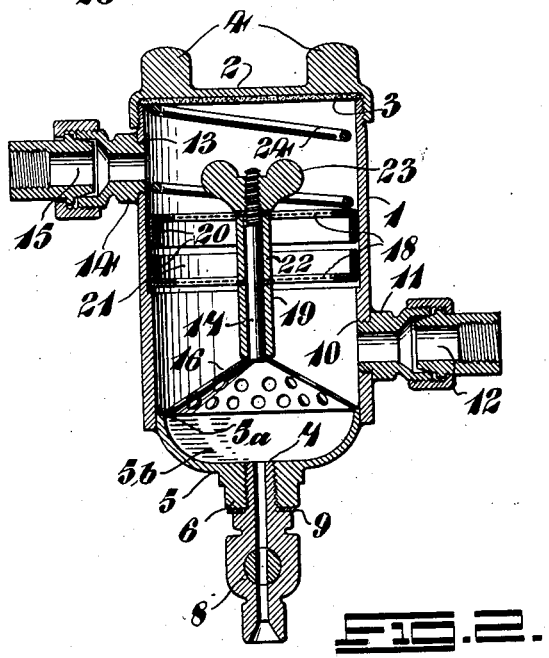
INVENTOR:
Abraham Blackman
BY: Ruegs, Boyer & Bakeler
ATTORNEYS.

Patented Dec. 7, 1926.

1,609,856

UNITED STATES PATENT OFFICE.

ABRAHAM BLACKMAN, OF LONDON, ENGLAND.

FILTER FOR PETROL AND OTHER LIQUIDS.

Application filed July 14, 1925, Serial No. 43,456, and in Great Britain February 28, 1925.

This invention comprises a new or improve apparatus for filtering liquids, and has particular, although not exclusive, reference to a petrol filter adapted to be fitted between the petrol supply and the carburetter in connection with an internal combustion engine upon a motor driven vehicle or the like.

According to the present invention a filter device is provided comprising an enclosed chamber or casing, one or more filtering elements mounted within said chamber, a liquid ingress opening into the chamber beneath said filtering element or elements, a liquid egress opening above said element or elements, a sump at the base of the chamber for receiving the foreign matter separated from the liquid, means for enabling said sump to be emptied, and means for preventing the foreign matter received within said sump from being slashed or thrown back out of same into the chamber.

Another feature of the invention consists in providing within the chamber immediately over the sump a perforated conical or domed member which permits of the passage from the filter chamber to the sump of the separated foreign matter while obstructing the return of said matter to said chamber.

Further features of the invention are included in the particular construction and arrangement of parts forming a filter device as hereinafter described and set forth in the appended claim.

For the purpose of more fully describing the nature of this invention, reference will now be made to the accompanying drawings, wherein:—

Fig. 1 is a perspective view illustrating a filter device in accordance with the present invention.

Fig. 2 is a vertical section through the device shown in Fig. 1.

Fig. 3 is a perspective view of the filter elements and perforated cone removed from the filter chamber.

In one method of carrying out the invention as applied to a device for filtering petrol delivered from a supply to the carburetter of the internal combustion engine, a cylindrical chamber 1 is provided closed at its upper end by a threaded cap 2 and a fibre or other washer 3 to render same liquid-tight, said cap 2 being, if desired, furnished with upstanding lugs 4 for enabling same to be assembled or removed. The cap 2 may, however, be formed with hexagon flats to receive a suitable turning tool or said cap may be provided with a milled edge.

The base 5 of the chamber is of dished or cupped formation having a downwardly projecting central boss 6 formed with a screw-threaded bore into which is screwed the hollow stem 7 of a tap 8, a fibre or other washer 9 providing a liquid-tight joint.

Near the lower end of the chamber 1 is an opening 10 into which is secured an externally threaded hollow boss 11 adapted to accommodate a union member 12 which connects to said boss 11 a pipe extending from the petrol tank or other supply. A second opening 13 with boss 14 and union 15 is located at or near the top of the chamber 1 on the opposite side to that at which the opening 10 is provided, a pipe extending from said opening 13 to the carburetter.

Removably assembled within the chamber 1 and resting immediately over the dished base 5 below the ingress opening 10, preferably upon a shoulder 5ª is a perforated cone 16, said cone being secured at the lower end of a threaded spindle 17 which projects vertically up the centre of the chamber. Mounted upon the spindle 17 at a position above the ingress opening 10 is a filter member composed of two horizontally disposed diaphragms 18 of suitable filtering material such as fine wire gauze or a combination of gauze and textile material, a sleeve 19 spacing the filter members from the cone 16.

Preferably the diaphragms 18 are carried by two circular L-sectioned metal frames or bezels 20 disposed one over the other with the horizontal flange of the bottom frame lowermost and that of the top frame uppermost so as to provide a space 21 between the diaphragms. A spacing sleeve 22 is advantageously assembled between the diaphragms 18 and a winged or other nut 23 secures said diaphragms in position.

Conveniently, the gauze or other diaphragms 18 are secured to the frames 20 by forming each frame of two comparatively thin L-sectioned members fixed one within the other and tightly gripping the gauze between the horizontal flanges of said frames as shown in Fig. 2.

Between the cap 2 and the diaphragms 18 is a spring 24 which functions to retain the said diaphragms and cone 16 from displacement.

In operation, the petrol supplied from a tank or the like enters the chamber 1, through opening 10 above the perforated cone 16, rises through the filtering members 18 and passes out from the chamber through the opening 13 to the carburetter, all dirt, grit and other foreign or deleterious matter being thus removed and remaining on the underside of the filtering members. The location of the conical member 16 relatively to the opening 10 is such that the inflowing fluid is caused to impinge upon said member, whereby any light foreign matter precipitates on to the cone 16 and passes through the perforations therein into the dished base 5 which constitutes a sump $5^b$, and any water entering the chamber 1 being of greater specific gravity than the petrol will also fall on to said cone and through same into the sump, whence said dirt and water is readily discharged by opening the tap or cock 8.

When the diaphragms 18 become choked by continued use, the same can be readily removed for cleaning or renewing by removing the cap 2, and unscrewing the nut 23.

It will be appreciated that after the water or foreign matter has entered the sump $5^b$, the same is prevented by the perforated cone 16 from being splashed or thrown up from said pump into the chamber above the cone or on to the diaphragms. The presence of said cone 16 also serves to minimize splashing due to violent vibration of a travelling vehicle.

The constructional details of the device may be modified in many ways without departing from the scope of the invention.

Claim:

In a filter for petrol and other liquids, a chamber closed at its upper end by a removable cap, said chamber having liquid ingress and egress openings situated respectively in the lower and upper parts of its wall, a dished base to said chamber for receiving foreign matter separated from the liquid in the chamber, a draw-off tap in said base, a perforated cone disposed over said dished base and located near the said ingress opening, an upstanding spindle on said cone, filtering diaphragms carried by said spindle and spaced from said cone, and means for removably retaining the cone and diaphragms in position within the chamber.

ABRAHAM BLACKMAN.